United States Patent
Garrido Lopez

(10) Patent No.: US 9,947,231 B2
(45) Date of Patent: Apr. 17, 2018

(54) METHODS AND SYSTEMS FOR CONTROLLING THE FLIGHT OF AIRCRAFT

(71) Applicant: The Boeing Company, Chicago, IL (US)

(72) Inventor: David Garrido Lopez, Madrid (ES)

(73) Assignee: The Boeing Company, Chicago, IL (US)

( * ) Notice: Subject to any disclaimer, the term of this patent is extended or adjusted under 35 U.S.C. 154(b) by 0 days.

(21) Appl. No.: 15/178,553

(22) Filed: Jun. 9, 2016

(65) Prior Publication Data

US 2016/0379501 A1     Dec. 29, 2016

(30) Foreign Application Priority Data

Jun. 26, 2015     (EP) .................................... 15382338

(51) Int. Cl.
*G08G 5/00* (2006.01)
*G05D 1/10* (2006.01)

(52) U.S. Cl.
CPC ........... *G08G 5/0052* (2013.01); *G05D 1/101* (2013.01); *G08G 5/0034* (2013.01)

(58) Field of Classification Search
CPC ..... G08G 5/0052; G08G 5/0034; G05D 1/101
USPC .......................................................... 701/5
See application file for complete search history.

(56) References Cited

U.S. PATENT DOCUMENTS 3,775,766 A * 11/1973 Gendreu ............... G01S 13/913
                                                    342/149
5,121,325 A      6/1992  DeJonge
6,507,782 B1     1/2003  Rumbo et al.
7,283,895 B2    10/2007  Bouchet
7,623,960 B2    11/2009  Wise et al.
7,756,632 B2     7/2010  Wise et al.
8,010,267 B2     8/2011  Klooster et al.
8,150,565 B2 *   4/2012  Wachenheim ....... G05D 1/0676
                                                    701/121
8,150,588 B2     4/2012  Klooster
8,311,687 B2    11/2012  Bakker
(Continued)

FOREIGN PATENT DOCUMENTS

EP          2924530      9/2015
WO          02093281    11/2002

OTHER PUBLICATIONS

"U.S. Appl. No. 15/192,238," filed with the United States Patent and Trademark Office dated Jun. 24, 2016, 55 pages.
(Continued)

*Primary Examiner* — Anne M Antonucci
(74) *Attorney, Agent, or Firm* — Hanley, Flight & Zimmerman, LLC

(57) ABSTRACT

Methods and systems for controlling the flight of aircraft are disclosed. An example method includes in response to a first time of arrival at a first waypoint, determining first cruise speeds and corresponding first descent speeds for the first waypoint at the first time of arrival; in response to a second time of arrival at a second waypoint, determining second cruise speeds and corresponding second descent speeds for the second waypoint at the second time of arrival, at least one of the first waypoint or the second waypoint being in a descent phase of a flight; identifying a third cruise speed and a third descent speed based on the first cruise and descent speeds and the second cruise and descent speeds, the first cruise and descent speeds including the third cruise speed and the third descent speed, the second cruise and descent speeds including the third cruise speed and the third descent speed; and identifying a trajectory of an aircraft that satisfies the third cruise speed and the third descent speed.

21 Claims, 9 Drawing Sheets

(56) References Cited

U.S. PATENT DOCUMENTS

| | | |
|---|---|---|
| 8,321,071 B2 | 11/2012 | Klooster |
| 8,332,145 B2 | 12/2012 | Dacre-Wright et al. |
| 8,340,843 B2 | 12/2012 | Coulmeau et al. |
| 8,352,169 B2 | 1/2013 | Coulmeau et al. |
| 8,442,707 B2 | 5/2013 | Ledesma et al. |
| 8,473,120 B2 | 6/2013 | Blanchon et al. |
| 8,676,403 B2 | 3/2014 | Garrido-Lopez et al. |
| 8,718,933 B2 | 5/2014 | Coulmeau et al. |
| 2010/0131125 A1* | 5/2010 | Blanchon .............. G05D 1/0005 701/3 |
| 2014/0343759 A1 | 11/2014 | Garrido-Lopez et al. |
| 2016/0069688 A1* | 3/2016 | Polansky .............. G05D 1/0005 701/3 |
| 2016/0379500 A1* | 12/2016 | Garrido Lopez ...... G05D 1/101 701/16 |

OTHER PUBLICATIONS

Federal Aviation Administration, "Next Gen Implementation Plan 2015," May 2015, 84 pages.

Sesar, "4D Flights to Make Air Travel Even More Predictable," published on Mar. 19, 2014, accessed on Jun. 9, 2016, [http://www.sesarju.eu/newsroom/all-news/4d-flights-make-air-travel-even-more-predictable], 3 pages.

Jackson, et al., "Airborne Required Time of Arrival (RTA) Control and Integration with ATM," AIAA Aviation Technology, Integration and Operations Conference (ATIO), Sep. 2007 (Paper AIAA 2007-7835), 17 pages.

European Patent Office, "Extended European Search Report," issued in connection with European Patent Application No. 15382338.0, dated Jan. 28, 2016, 10 pages.

* cited by examiner

METHODS AND SYSTEMS FOR CONTROLLING THE FLIGHT OF AIRCRAFT

RELATED APPLICATION

This patent claims priority to EP15382338.0 filed on Jun. 26, 2015. EP15382338.0 is hereby incorporated herein by reference in its entirety.

FIELD OF THE DISCLOSURE

This patent relates generally to controlling the flight of aircraft and, more specifically, to methods and systems for controlling the flight of aircraft.

BACKGROUND

Air traffic management modernization is evolving from surveillance-based management (control based on knowing where aircraft are) toward trajectory-based management (control based on knowing where aircraft will be). Due to the dependency on trajectory prediction, trajectory-based management uses the aircraft trajectory to avoid large, unpredictable deviations.

SUMMARY

An example method includes in response to a first time of arrival at a first waypoint, determining first cruise speeds and corresponding first descent speeds for the first waypoint at the first time of arrival; in response to a second time of arrival at a second waypoint, determining second cruise speeds and corresponding second descent speeds for the second waypoint at the second time of arrival, at least one of the first waypoint or the second waypoint being in a descent phase of a flight; identifying a third cruise speed and a third descent speed based on the first cruise and descent speeds and the second cruise and descent speeds, the first cruise and descent speeds including the third cruise speed and the third descent speed, the second cruise and descent speeds including the third cruise speed and the third descent speed; and identifying a trajectory of an aircraft that satisfies the third cruise speed and the third descent speed.

BRIEF DESCRIPTION OF THE FIGURES

The figures are not to scale. Whenever possible, the same reference numbers will be used throughout the drawing(s) and accompanying written description to refer to the same or like parts.

DETAILED DESCRIPTION

Figure 1:
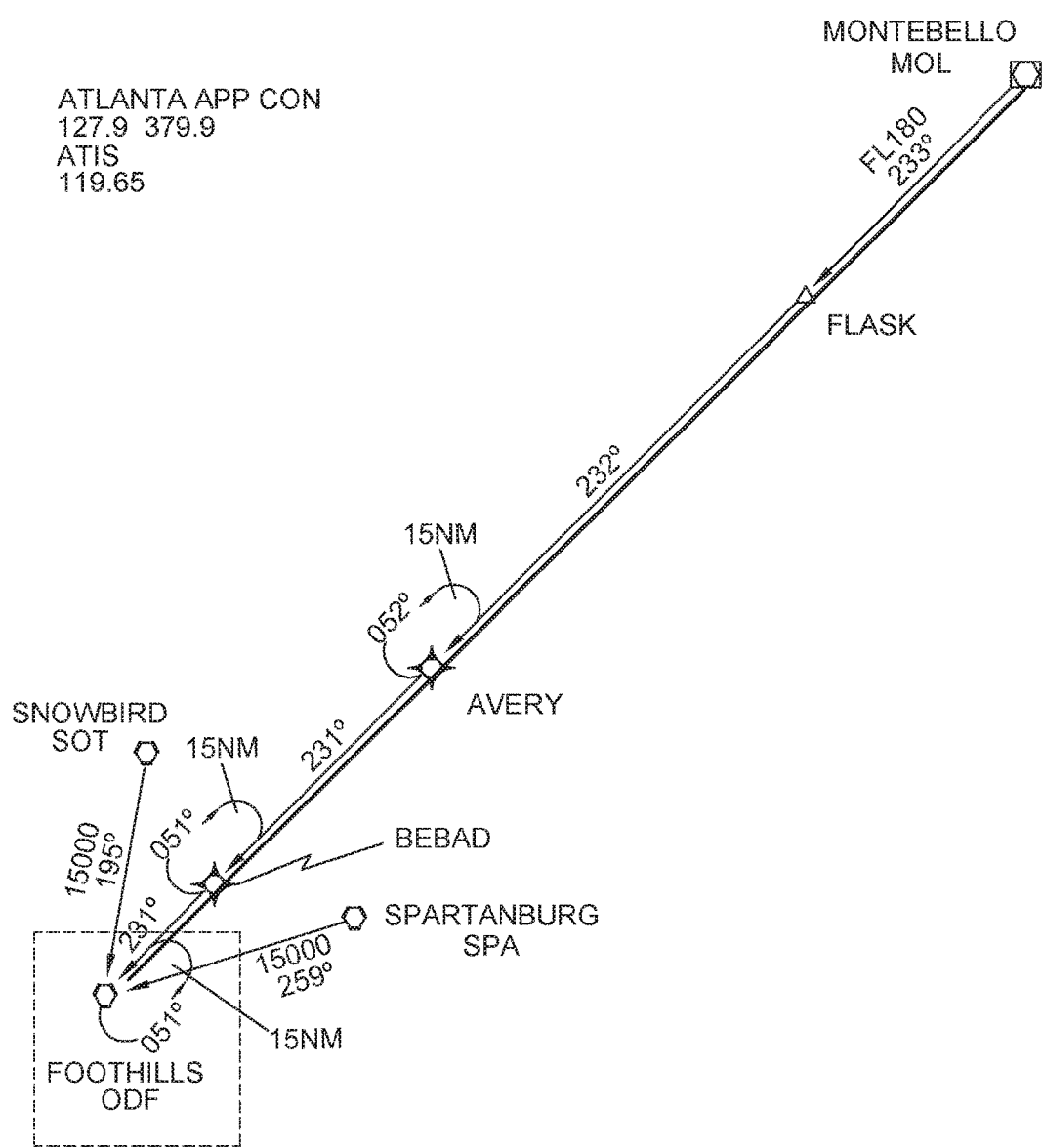
FIG. 1.—Shows a first part of DIRTY Standard Arrival Procedure (STAR) of a flight arriving at Atlanta International Airport.

Some commercial aircraft have a Required Time of Arrival (RTA) function available, which is potentially a very useful airside function to meet time constraints imposed by air traffic management systems, and in particular, by arrival managers of an airport terminal area.

The aircraft trajectory under RTA control becomes predictable in the sense that the aircraft will hopefully reach the RTA target waypoint at the predicted (and required) time.

In some examples, the RTA function of an aircraft is activated when the pilot sets a required time of arrival at a target waypoint ahead of the current position of the aircraft. In some examples, the RTA function is activated when the airline, the air traffic management, the pilot, or another authority imposes an arrival time constraint close to the destination airport. For example, the RTA function is activated when the flight is still in cruise phase, but the target waypoint is well within the phase of descent. In some examples, the RTA function then predicts a trajectory that satisfies the time constraint and modifies the flight speeds accordingly. However, current operational RTA functions consider only one RTA at a single waypoint.

If the flight is in cruise phase and the target waypoint is in the descent phase, some example RTA functions do not predict trajectories having a varying cruise speed and a varying descent speed independently. For example, some example RTA functions may not predict trajectories having a varying cruise Mach speed and varying descent Calibrated Air Speed (CAS), independently. Instead of independently predicting trajectories having varying cruise and descent speeds, some example RTA functions iterate over an example Cost Index (CI) that couples Mach and CAS variations. Each CI may define a unique Mach/CAS combination, given the cruise altitude, weight, and meteorological conditions. In some examples, the CI is used for the initial trajectory prediction as well as for speed corrections during the operation.

A trajectory-based arrival management system may set time windows at different waypoints: for instance, at a first waypoint where more than one arrival converges, and later at a second waypoint closer to the runway approach to maintain a sequence of aircraft landing. Thus, in some examples, imposing RTAs at two different waypoints would benefit the merging and spacing of the incoming traffic during cruise and descent, such as, for example, at both high altitudes and then closer to the final approach to the runway.

However, time deviations with respect to the initially estimated arrival times at intermediate waypoints cannot be prevented by conventional RTA functions. Some examples break the reference trajectory in as many trajectory segments as intermediate waypoints and calculate a cruise/descent speed pair for each trajectory segment, wherein each cruise/descent speed pair meets the corresponding RTA at the intermediate waypoint ahead. This example solution disregards arrival times beyond the next RTA waypoint and calculates a plurality of trajectories and, thus, a number of speed changes during the cruise phase and/or during the descent phase of a flight and more computational requirements. As such, examples in which the cruise and descent speeds between a first waypoint and a second waypoint are determined without consideration of the cruise and descent speeds between the second waypoint and a third waypoint may be inefficient.

In some examples, cruise and descent speed combinations may be determined that are not dependent on the Cost Index. For example, the examples disclosed herein enable cruise and descent speed combinations to be used to plan trajectories based on operating parameters of the aircraft and/or other parameters (e.g., weather).

While the examples disclosed herein may be implemented in connection with any aircraft, in some examples, a flight and/or an aircraft implementing the examples disclosed herein may include the following conditions:

Aircraft: Boeing 737-800

Initial conditions: cruising at an altitude of 35,000 ft., at maximum landing weight (MLW=144,000 lbs.).

Figure 2:
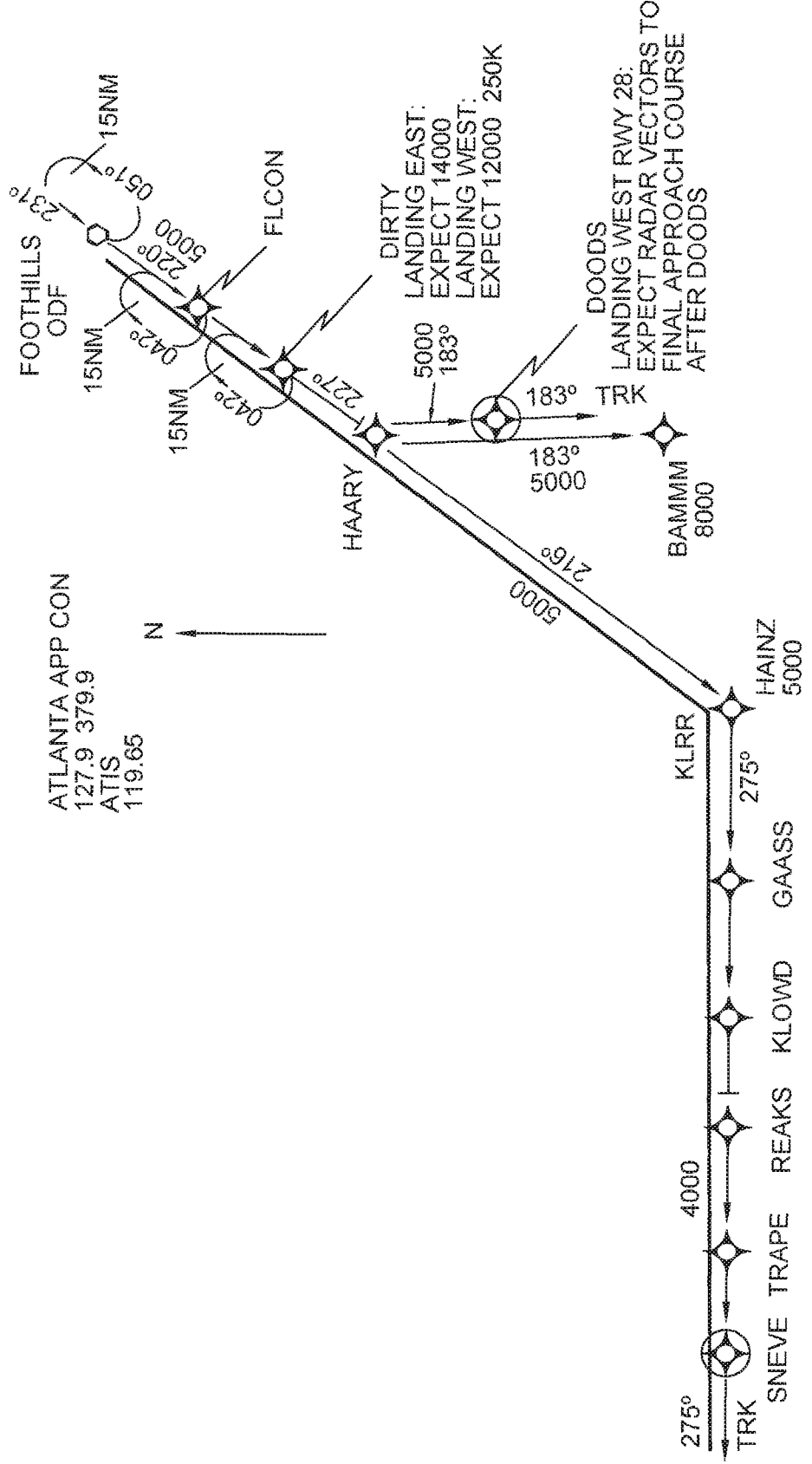
FIG. 2.—Shows a second part of DIRTY STAR of the flight arriving at Atlanta International Airport, shown in FIG. 1.
Figure 3:
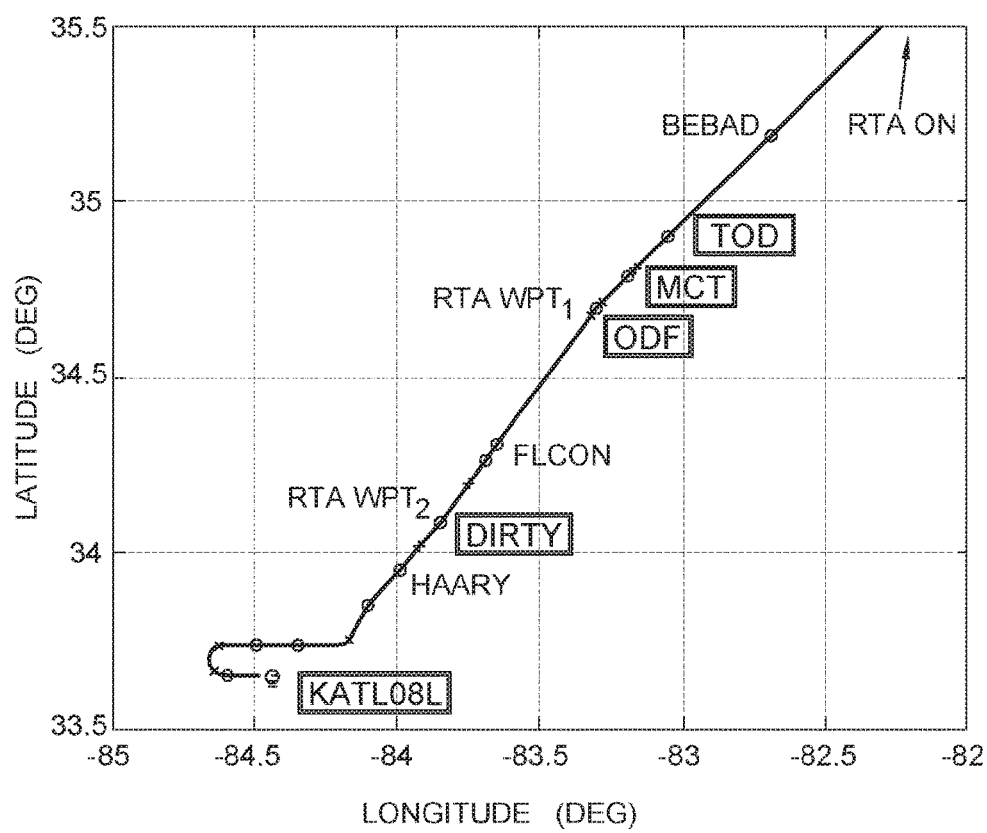
FIG. 3.—Shows the lateral path of the flight example shown in FIGS. 1 and 2.

The lateral path of the flight is a standard arrival into Atlanta International Airport (see FIGS. 1, 2, and 3). While the examples disclosed herein mention the Atlanta International Airport, the examples disclosed herein may be used by any aircraft at any airport.

Weather conditions: No winds, and standard atmosphere.

For typical cruise altitudes above 30,000 ft., which is the case for a vast majority of commercial flights and for this particular example, the cruise speed is expressed as a Mach number. In this example, the aircraft in its descent is generally flown at constant Calibrated Air Speed (CAS).

As shown in FIG. 1, the initial point of the aircraft for this particular example is "Montebello (MOL)." As shown in FIG. 2, a few miles into the arrival, when the along-track distance to waypoint "DIRTY" and/or a second waypoint is 200 nautical miles (NM), the pilot sets a RTA at waypoint "DIRTY." Additionally, the pilot also sets a different RTA at waypoint "Foothills (ODF)" and/or a first waypoint, which is 50 NM before reaching waypoint "DIRTY." For this particular example, only two RTAs at two target waypoints have been set, although more RTAs at different waypoints might be set, too.

The illustrated examples of FIGS. 1 and 2 show flight details of a selected arrival procedure of an aircraft. As shown in FIG. 3, this arrival procedure is a part of a flight that ends at runway "08L" of the Atlanta International Airport (KATL). Details of the aircraft approach operation to the airport are not shown, because they do not affect the RTA examples described herein. More specifically, FIG. 1 shows a first part of the "DIRTY" transition route for arriving at the Atlanta International Airport, and FIG. 2 shows at second part of the "DIRTY" transition route. In some examples, "DIRTY" refers to when the landing gear and/or flaps of the aircraft are extended. In some examples, the aircraft is considered "DIRTY" a few miles before the aircraft is directed to the particular runway approach (see points "Haary" and "Doods" in FIG. 2). Having the spacing of the aircraft satisfy a first threshold when the aircraft is considered "DIRTY" and/or at the first waypoint substantially ensures that the spacing of the aircraft satisfies a second threshold when the aircraft arrives at a runway. In some examples, the first threshold is the same and/or similar to the second threshold. As shown in the illustrated example of FIG. 1, at "ODF" and/or the first waypoint, three different transitions to the arrival converge: specifically, a first transition from "Montebello (MOL)," a second transition from "Snowbird (SOT)" and a third transition from "Spartanburg (SPA)." As such, in some examples, at least three aircraft might merge in waypoint "ODF" at the same time. Therefore, the timing when aircraft arrive to the first waypoint is carefully calculated to substantially ensure the safe merger and/or flow of traffic as aircraft converge on the first waypoint to merge the traffic flow while substantially ensuring minimum separations between aircraft. Therefore, the examples disclosed herein enable a first time of arrival (RTA) at "ODF" and/or the first waypoint, and a second RTA at "DIRTY" and/or a second waypoint to be derived to substantially ensure that the different aircraft maintain the required times of arrival at the different waypoints.

The illustrated example of FIG. 3 shows the lateral path of the flight example of FIGS. 1 and 2, starting from the instant in which the pilot turns on the RTA function at "Montebello MOL" and/or a first position until the aircraft is landed at the corresponding runaway of the Atlanta Airport ("KATL08L"). More specifically, the example of FIG. 3 shows the position of waypoint "ODF" (RTA WPT$_1$ and/or the required time of arrival of the first waypoint hereafter) and waypoint "DIRTY" (RTA WPT$_2$ and/or the required time of arrival of the second waypoint hereafter) relative to the lateral path of the flight example. In the illustrated example, the required time of arrival of the first waypoint is shortly after the beginning of descent (Top of descent "TOD") and the initial Mach to CAS transition location (MCT). In the illustrated example, the required time of arrival of the second waypoint has an altitude constraint of 14,000 ft. and is more than ⅔ into the descent. However, the second waypoint can be positioned in any other location. The illustrated example of FIG. 3 includes other intermediate waypoints. BEBAD and/or a third waypoint, FLCON and/or a fourth waypoint and HAARY and/or a fifth waypoint are shown in order to clearly define the lateral path of the aircraft. In this particular example, both the first and second waypoints have been set during the descent phase of the flight. However, in other examples, the first and second waypoints may be defined at any other point during the flight. For example, the first waypoint may be defined during the cruise phase of the flight, and the second waypoint may be defined during the descent phase of the flight. Additionally and/or alternatively, the first waypoint and the second waypoint may be defined during the cruise phase of the flight.

Figure 4:
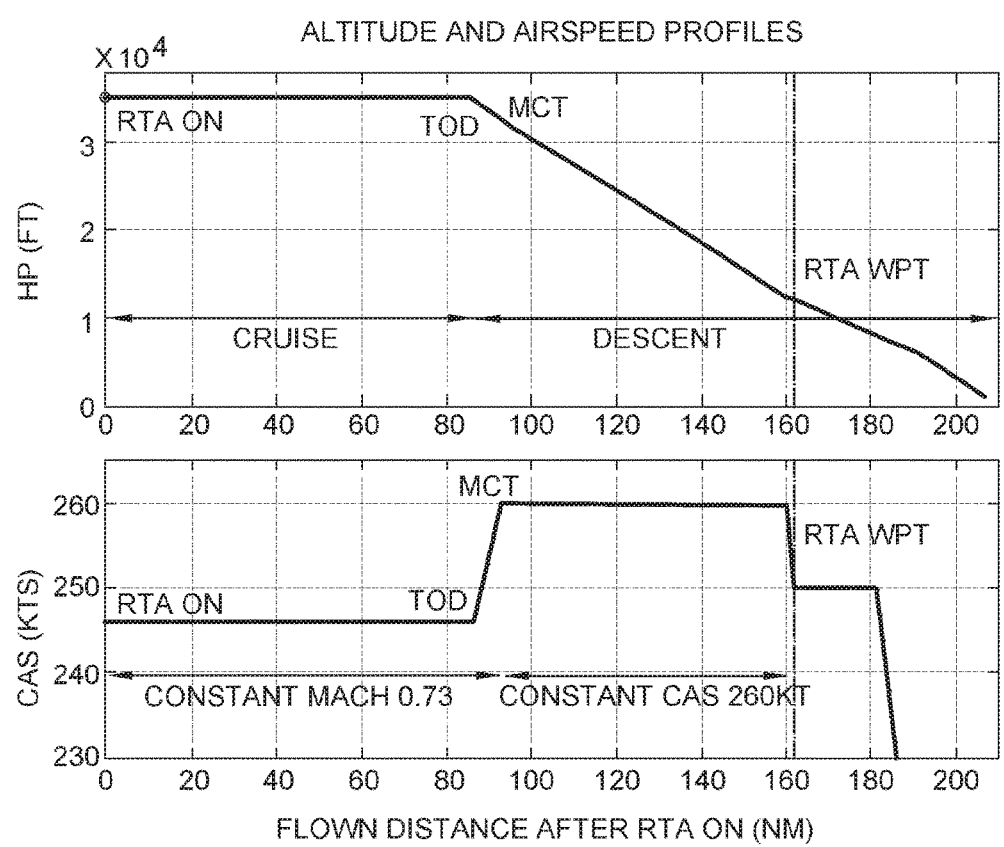
FIG. 4.—Shows the pressure altitude (top graph) and Calibrate airspeed (bottom graph) of a typical continuous descent trajectory of a conventional commercial flight, as a function of flown distance.

The illustrated example of FIG. 4 shows an example of pressure altitude and Calibrate Airspeed (CAS) as a function of the along-track distance for an arrival procedure of a commercial flight. Specifically, in the illustrated example, the upper graph shows the altitude profile of a commercial flight as a function of the along-track distance, where the graph shows the distance from the instant and/or point at which the pilot turns on the example RTA function until the aircraft lands, which takes about 205 NM. This upper graph of the example of FIG. 4 shows the Top of Descent point (TOD) and the Mach to CAS transition (MCT) point at which the aircraft changes from the cruise phase to the descent phase. In the illustrated example, the cruise altitude of the aircraft is around 35,000 ft. The example of FIG. 4 illustrates one waypoint being established at 162 NM from the position at which the pilot turns on the example RTA function. The bottom graph of the illustrated example of FIG. 4 shows the airspeed profiles of the aircraft during the cruise/descent operation. Specifically, in this example, during the cruise phase and the beginning of the descent phase until the aircraft arrives to the MCT point, the aircraft flies with a constant Mach number of 0.73, and during the descent phase, the aircraft flies at a constant CAS speed of 260 knots (KT). Before reaching the destination airport, the aircraft reduces its speed.

Figure 5:
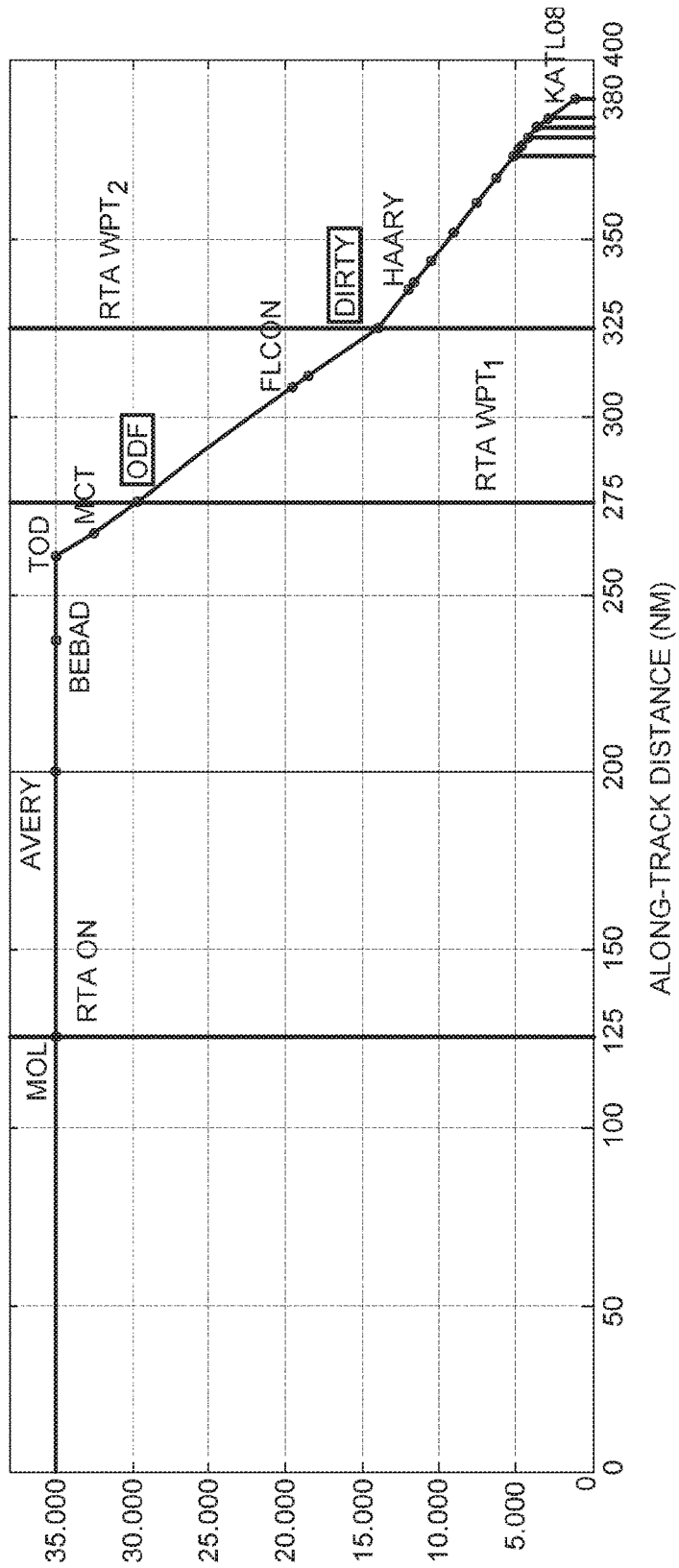
FIG. 5.—Shows the pressure altitude graph as a function of flown distance of the flight example of FIGS. 1 to 3.

The illustrated example of FIG. 5 shows the pressure altitude profile as a function of the along-track distance for the examples of FIGS. 1, 2 and 3. For this particular example, the example RTA function is turned on at "MOL" and/or the first position during the cruise phase and 255 NM before arriving to the destination airport "KATL08L." In the illustrated example of FIG. 5, the required time of arrival of the second waypoint is set at "DIRTY," which is located in the descent phase of the flight. In the illustrated example, the along-track distance from "MOL" and/or the first position to the second waypoint is 200 NM. However, in other examples, the distance between the first position and the second waypoint may be any suitable distance. In the illustrated example, the required time of arrival of the first waypoint is set at "ODF," which is located 50 NM before "DIRTY" and 105 NM before "KATL08L." In the illustrated example, the first waypoint (e.g., "ODF") is also set in the descent phase of the aircraft. However, in other examples, the first waypoint may be set at a time other than the descent phase, such as, for example, during the cruise phase.

Figure 6:
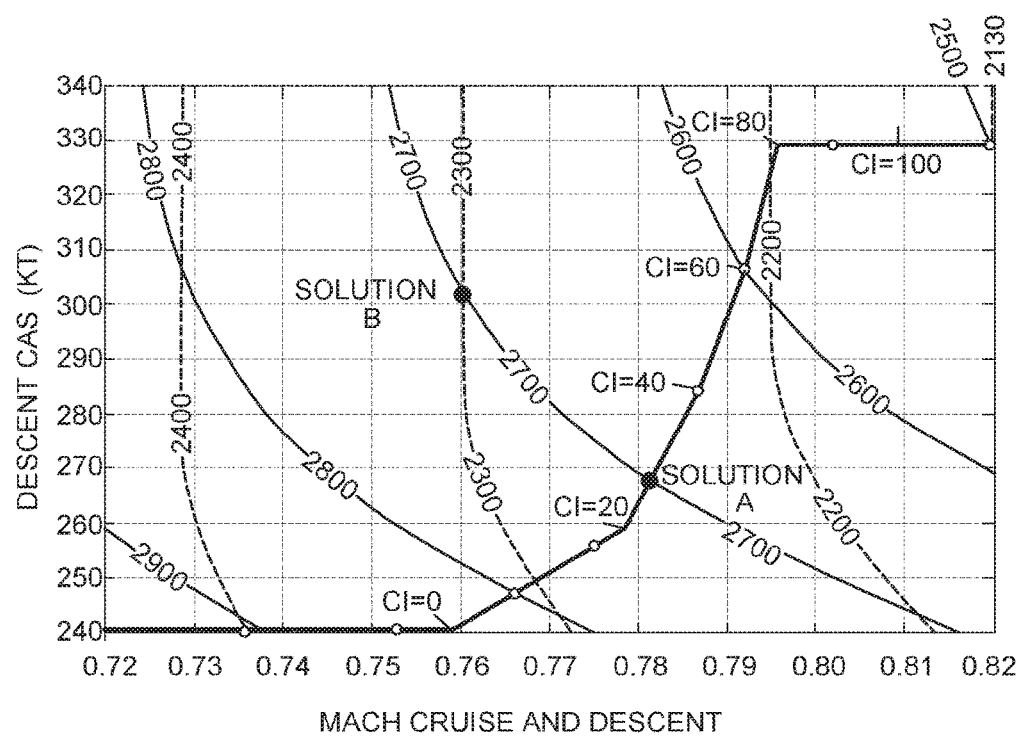
FIG. 6.—Shows an isocontours graph of two estimated arrival times for two different RTAs at two different waypoints for the flight example of FIGS. 1 to 3 and 5, as a function of the descent CAS and the cruise Mach and descent Mach. It also shows the conventional dependency of cruise Mach and descent CAS as a function of the Cost Index.

The illustrated example of FIG. 6 shows the predicted arrival times for the required time of arrival of the first waypoint and the required time of arrival of the second waypoint as a function of the cruise Mach and descent CAS for the flight example of FIGS. 1, 2, 3 and 5. In the illustrated example, the boundaries of this diagram are the Mach and CAS limits. For this particular example, the example RTA function is configured not to program CAS speeds below 240 KT or above 330 KT and is configured not to program Mach speeds below 0.72 or above 0.82. These speed limits correspond to the case of an aircraft flying at an altitude of 35,000 ft. and with a weight of 144,000 lbs. In general, speed limits depend on weight and altitude. While the examples disclosed herein mentioned CAS speeds and Mach speeds used when implementing the example shown in FIG. 6, in other examples, the threshold CAS speeds (e.g., minimum/maximum speeds) and/or the threshold Mach speeds (e.g., minimum/maximum speeds) that are considered when identifying possible speeds and/or trajectories during any portion(s) of a flight may be different. For example, the example RTA function may be configured to program CAS speeds below 240 KT and/or above 330 KT and/or the example RTA function may be configured to program Mach speeds below 0.72 and/or above 0.82. The graph of FIG. 6 represents two overlapped contour maps as a function of cruise Mach and descent CAS, where the dashed isocontours represent estimated arrival times at the required time of arrival of the first waypoint, and the thin solid isocontours represent estimated arrival times at the required time arrival of the second waypoint. In the illustrated example, times are shown in seconds, and the reference t=0 represents the moment and/or time when the pilot activates the RTA function. As illustrated in the example of FIG. 6, there is a plurality of combinations of Mach/descent CAS speeds that meet the selected RTA at each one of the selected waypoints. For example, for the first waypoint represented by dashed isocontours, there are numerous combinations of Mach/descent CAS speeds for each of the dashed lines representing 2,200 seconds, 2,300 seconds and 2,400 seconds. Additionally, as shown in the illustrated example, for the second waypoint represented by the solid isocontours, there are many combinations of Mach/descent CAS speeds for each of the solid lines representing 2,600 seconds, 2,700 seconds, 2,800 seconds and 2,900 seconds.

In the illustrated example, each isocontour illustrated by the solid lines corresponding to 2,600 seconds, 2,700 seconds, 2,800 seconds and 2,900 seconds and the dashed lines corresponding to 2,200 seconds, 2,300 seconds and 2,400 seconds represent a plurality of Mach/CAS combinations that meets and/or satisfies the required time of arrival. Therefore, for a particular example in which the required time of arrival is 2,200 seconds (36 min and 40 seconds) at the first waypoint (e.g., "ODF"), the dashed isocontour tagged with "2200" in FIG. 6 would represent all the possible Mach/CAS combinations that could meet and/or satisfy the RTA at the first waypoint (based on the constraints implemented in the illustrated example, such as the combinations that satisfy the aircraft speed limits).

As shown in the example of FIG. 6, the earliest and/or minimum time of arrival that can be achieved for the required time arrival of the first waypoint (at waypoint "ODF") in this particular example (considering the aircraft speed limits) is 2,130 seconds approx. (35 min. and 30 s. past initial time), flying at M=0.82 and CAS=330 KT. In the illustrated example of FIG. 6, the latest and/or maximum time of arrival that can be achieved for the first waypoint is 2,445 seconds (40:45 past initial time), flying at M=0.72 and CAS=240 KT (line not shown). For the required time of arrival of the second waypoint (at waypoint "DIRTY"), the earliest and/or minimum time of arrival that can be achieved for the $2^{nd}$ waypoint is about 2500 seconds (41:40 past initial time) flying at M=0.82 and CAS=330 KT. In the illustrated example of FIG. 6, the latest time of arrival, the latest and/or maximum time of arrival that can be achieved for the second waypoint is about 2,920 seconds (48:40 past initial time) flying at M=0.72 and CAS=240 KT (line not shown).

The illustrated example of FIG. 6 also shows the possible cruise Mach and descent CAS combinations as a function of Cost Index (see black dash-dot line superposed to the diagram). In some examples, Flight Management Computers (FMC) iterate over the Cost Index (CI) to find the Mach/CAS combination that satisfies a given RTA. For this particular example, the pilot enters and/or the system receives for the required time arrival of the second waypoint (waypoint "DIRTY") a single RTA=initial time+45 min, as requested by the example Arrival Manager. Then the computer and/or an example determiner implemented by a processor that is configured to identify the trajectory corresponding to the intersection of RTA=2,700 s (e.g., solid isocontour tagged with 2,700) and the Cost Index line identifies the trajectory. As shown in the illustrated example of FIG. 6, the resulting Cost Index (CI) is close to 30 approximately, and the corresponding speeds are M=0.782 CAS=268 KT. Determination by the computer and/or determiner is identified in FIG. 6 as "Solution A." As shown in the example of FIG. 6, when the Cost Index is used in combination with the isocontour for the second waypoint to identify the Mach cruise and descent speeds/descent CAS, only one combination of speeds meets and/or satisfies the single RTA at the second waypoint "DIRTY" as a function of the CI. In some examples, a given Cost Index implies a balance between fuel and operational costs. For example, if an airline imposes a specific Cost Index (CI) close to zero (corresponding to the minimum-fuel consumption trajectory), then the previous RTA of 2,700 seconds could not be met. Furthermore, if the cited Mach/CAS combination (M=0.782 CAS=268 KT) is selected without taking into account the required time arrival of the second waypoint, then the only required time of arrival at a second waypoint ahead would be restricted to these aircraft speeds, for example.

In the example in which, in order to avoid conflict with other aircraft merging at "ODF" (the required time of arrival of the first waypoint), the example Arrival Manager determines that the aircraft should pass the intermediate waypoint and/or the first waypoint ("ODF") at a required time of arrival $RTA_1$=2,300 seconds (initial time plus 38:20), the solution provided by an example CI-coupled Mach/CAS combination ("Solution A") may not be valid for meeting and/or satisfying the time constraint at the required time of arrival of the first waypoint, because "Solution A" leads to an arrival time equal to the initial time plus 2,225 s. (37:05), which, in this example, is more than one minute early. As such, some example RTA functions cannot find a single trajectory that satisfies two time constraints (with some highly unlikely exceptions).

As shown by the illustrated example of FIG. 6, many different Mach/CAS pairs lead to a trajectory satisfying the $RTA_2$=2,700 s at the second waypoint ("DIRTY") other than the Cost Index (CI) coupled pair. As shown by the illustrated example of FIG. 6, these combinations are represented by the thin solid isocontour $RTA_2$=2,700 s. Therefore, using the examples disclosed herein, the determiner can identify and/or search for the intersection of the isocontour corresponding to 2,700 seconds for the second waypoint with the dashed isocontour $RTA_1$=2300 s, which represents the required arrival time at the first waypoint "ODF." In other words, using the examples disclosed herein, the example determiner takes into account both the speed combinations for satisfying the required time of arrival at the first waypoint and the speed combinations for satisfying the required time of arrival at the second waypoint. Therefore, in order to meet and/or satisfy both constraints, the aircraft implemented with the examples disclosed herein identifies and/or selects the speeds Mach=0.76 and CAS=302 KT. If an example aircraft is not implemented with the examples disclosed herein, such as an aircraft that uses the Cost Index without regard to the teachings of this disclosure, a single Mach cruise/Descent CAS (KT) may not be identifiable. In the illustrated example of FIG. 6, the results identified by the example determiner implemented with the teachings of this disclosure is represented by "Solution B." In examples in which more required times of arrival are added at different waypoints, the example determiner implemented with the teachings of this disclosure would identify the intersection of all the isocontours corresponding to each one of the RTAs at their corresponding waypoints as the single Mach cruise/descent CAS(KT).

Figure 7:
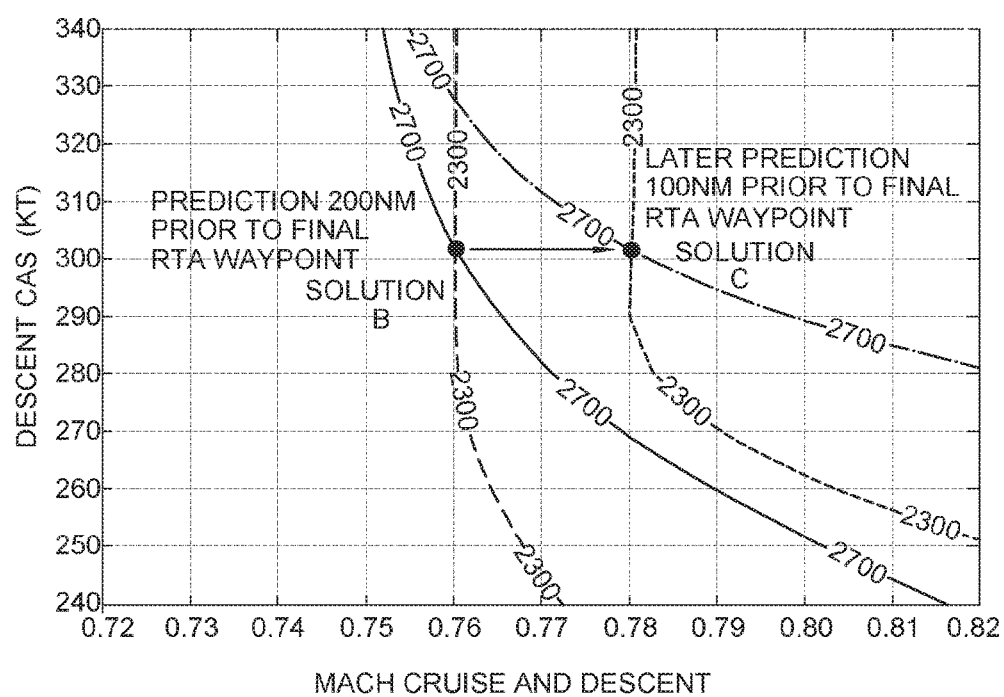
FIG. 7.—Shows an isocontours graph wherein a comparison of the speeds is calculated to meet the respective time constraints at the two waypoints with functions activated and the corrected speeds at a later time.

During the operation of the examples disclosed herein, uncertainties, such as wind forecast errors, may force the example RTA function to recalculate the trajectory and correct and/or modify the flight speeds in order to meet and/or satisfy the required time of arrival (RTA) as illustrated in the example FIG. 7. In this particular example and as explained in the previous paragraph, the aircraft and/or the example determiner configured in accordance with the teaching of this disclosure firstly selects the speeds Mach=0.76 and CAS=302 KT to meet and/or satisfy the required time of arrival of the first waypoint and the required time arrival of the second waypoint when the aircraft is 200 NM away from the second waypoint ("DIRTY"). In the illustrated example of FIG. 7, after 100 NM the aircraft, which in this example is continuously and dynamically monitoring the distances, speeds and estimated time of arrival, and/or the example determiner determines that and/or finds out that there are significant time errors at both the first and second waypoints if the aircraft follows the trajectory given by and/or included with the original cruise and descent speeds. Then, using examples disclosed herein, the aircraft and/or the example determiner recalculates the new isocontours of estimated arrival times. In the illustrated example, at this point the aircraft is about 50 NM away from the first waypoint ("ODF") and 100 NM away from the second waypoint ("DIRTY"). In response to identifying that the first and/or second waypoints will not be met based on, for example, newly available information to the determiner and/or the aircraft, the example determiner searches for a new intersection of $RTA_1$=2,300 s and $RTA_2$=2,700 s that enables the required times of arrival for the first and second waypoints to be met and satisfied. For these conditions and in order to meet and/or satisfy both constraints, the aircraft corrects the reference trajectory by selecting speeds Mach=0.78 and CAS=302 KT. This is represented in the illustrated example of FIG. 7 as "Solution C."

Figure 8:
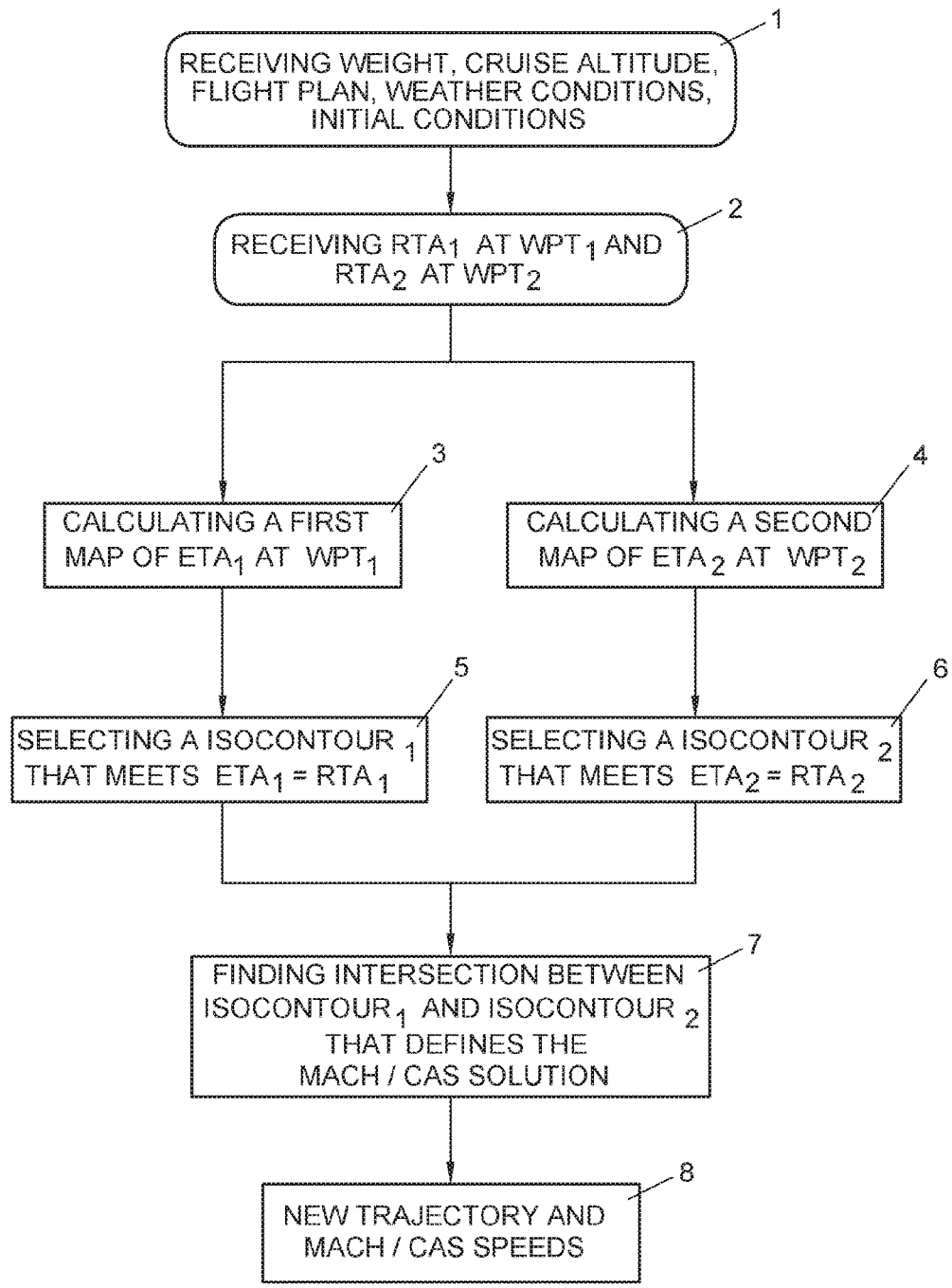
FIG. 8.—Shows a flow diagram in which a particular embodiment of the example method is disclosed.

FIG. 8 shows a flow diagram of a particular example in which two RTAs are provided. The flow diagram includes the following processes:

receiving (1) a set of given conditions at, for example, the example determiner and/or at the example flight management computer, the given conditions at least including one or more of the weight of the aircraft, the cruise altitude, the flight plan, the weather conditions and the initial conditions, at the time when the RTA function is activated;

receiving at, for example, the determiner and/or the flight management computer, (2) a first required time of arrival ($RTA_1$) at a first waypoint ($WPT_1$) ahead of and/or before a second required time of arrival ($RTA_2$) at a second waypoint ahead ($WPT_2$);

calculating using, for example, the example determiner and/or the example flight management computer, (3) a first map and/or corresponding values of estimated times of arrival and/or first estimated times of arrival ($ETA_1$) at the first waypoint "$WPT_1$." In some examples, the determiner and/or the example flight management computer uses constraints and/or parameters of the aircraft and/or other conditions (e.g., weather). In illustrated examples, the first map is a function of the cruise Mach and descent CAS of the aircraft (e.g., see FIGS. 6, 7, etc.). An example output of the example determiner and/or the example flight management computer is illustrated by the set of dashed isocontours of FIG. 6. In some examples, the determiner and/or the example flight management computer may be configured to calculate the Mach cruise/descent CAS for the required time(s) of arrival for the respective waypoints with more or less accuracy. Regardless of the accuracy with which the example determiner and/or the example flight management computer determines the Mach cruise/descent CAS for the required time(s) of arrival for the respective waypoints, the example determiner and/or the example flight management computer calculates arrival times for a 2-D grid of cruise Mach and descent CAS values. In the illustrated example of FIG. 6, the example determiner and/or the example flight management computer uses a total of 121 conditions (11 cruise Mach×11 descent CAS) to identify and/or calculate the results. Then, using the example determiner and/or the example flight management computer (5), isocontours (iso-$contour_1$) corresponding to the first required time of arrival ($RTA_1$) at "$WPT_1$" are selected by finding the descent CAS that makes and/or enables the first estimated time of arrival equal to the first required time of arrival ($ETA_1=RTA_1$) for a given cruise Mach and/or by finding the cruise Mach that makes and/or enables the first estimated time of arrival equal to the first required time of arrival ($ETA_1=RTA_1$) for a given descent CAS;

calculating, using the example determiner and/or the example flight management computer (4), a second map and/or values of estimated times of arrival and/or second estimated times of arrival ($ETA_2$) at the second waypoint "$WPT_2$" within the speed limits and under the given conditions. In illustrated examples, the second map and/or corresponding values is a function of the cruise Mach and descent CAS of the aircraft. The example isocontours and/or corresponding values output by the example determiner and/or the example flight management computer are represented by the thin solid isocontours of FIG. 6. Then, selecting using the example determiner and/or the example flight management computer, (6) the isocontour (isocontour$_2$) corresponding to the second required time of arrival ($RTA_2$) at "$WPT_2$" by finding and/or identifying the descent CAS that makes and/or enables $ETA_2=RTA_2$ for a given cruise Mach or by finding the cruise Mach that makes and/or enables $ETA_2=RTA_2$ for a given descent CAS;

finding using, for example, the example determiner and/or the example flight management computer (7). the intersection of the selected "isocontour$_1$," and the "isocontour$_2$." This intersection is shown by the output of the example determiner and/or the example flight management computer, which defines the solution and the required cruise Mach and descent CAS combination; and, selecting using, for example, the example determiner and/or the example flight management computer (9), the cruise Mach and descent CAS, and to establish the new reference trajectory.

Since the use of maps and/or corresponding values and isocontours and/or corresponding values is a particular example of the method described in connection with the examples disclosed herein, in a most general solution, the example method that the example determiner and/or the example flight management computer implements calculates a first set of Mach/CAS combinations that meets and/or satisfies a first time of arrival ($ETA_1$) at the first waypoint ($WPT_1$) and selects a first subset of Mach/CAS combinations, from the first set of Mach/CAS combinations, for which $ETA_1=RTA_1$. Then the example method calculates a second set of Mach/CAS combinations that meets and/or satisfies a second time of arrival ($ETA_2$) at the second waypoint $WTA_2$ and selects a second subset of Mach/CAS combinations from the second set of Mach/CAS combinations, for which the second estimated time of arrival equals the second required time of arrival ($ETA_2=RTA_2$). After that, the example method compares the Mach/CAS combinations of the first subset with the Mach/CAS combinations of the second subset, selecting the Mach/CAS combination existing in both subsets. This selection may be made by using a two-dimensional root-finding algorithm such as the Broyden's method. Other methods can be used for finding the root of the functions that define the sets of Mach/CAS combinations. The example method establishes a new reference trajectory based on the selected cruise Mach and descent CAS speeds combination.

Figure 9:
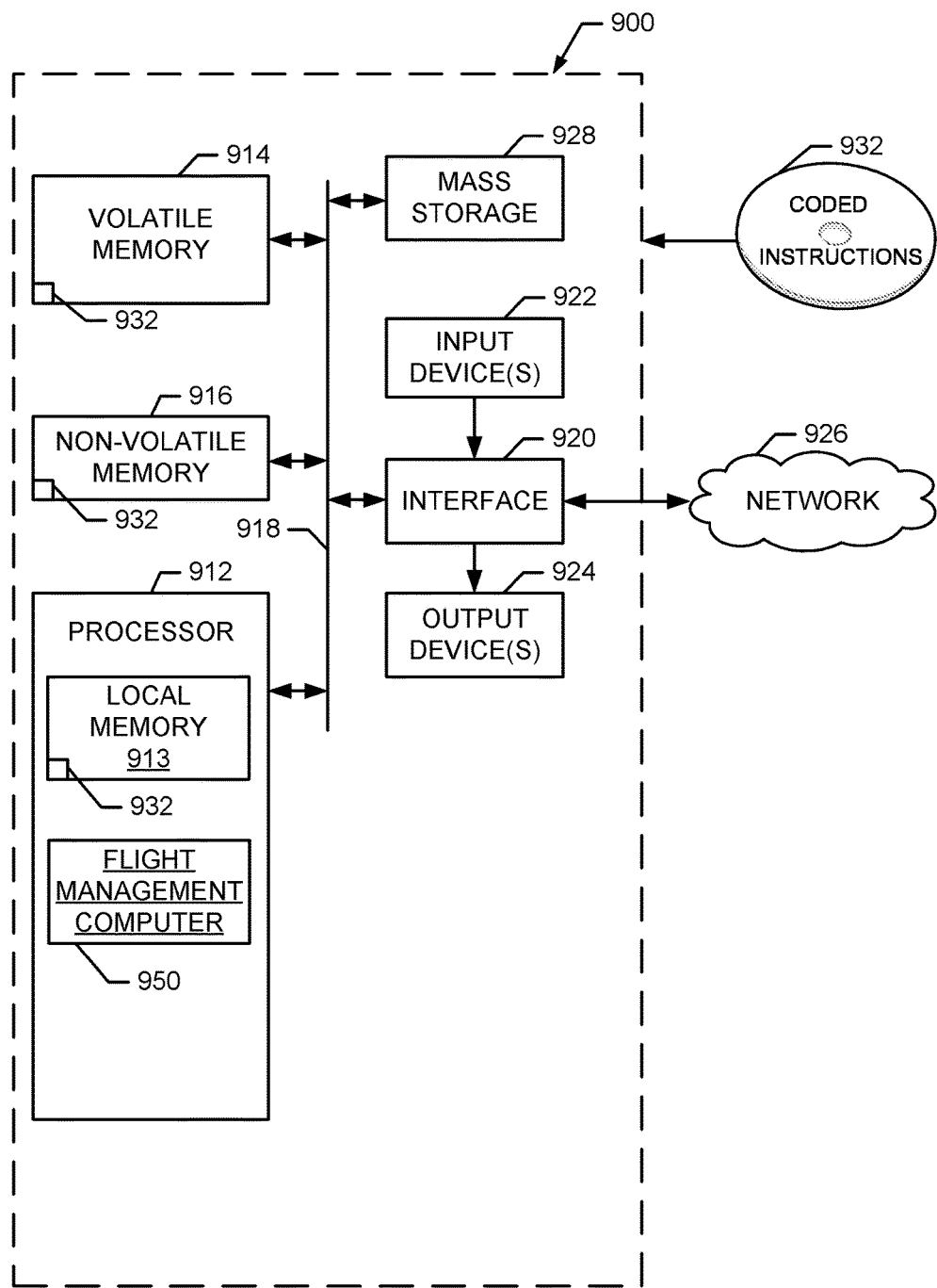
FIG. 9.—Shows a processor platform to execute the instructions of FIG. 8 to implement the examples disclosed herein.

FIG. 9 is a block diagram of an example processor platform 900 capable of executing the instructions of FIG. 8 to implement the examples disclosed herein. The processor platform 900 can be, for example, a server, a personal computer, a mobile device (e.g., a cell phone, a smart phone, a tablet such as an a personal digital assistant (PDA), an Internet appliance, a DVD player, a CD player, a digital video recorder, a Blu-ray player, a personal video recorder, or any other type of computing device.

The processor platform 900 of the illustrated example includes a processor 912. The processor 912 of the illustrated example is hardware. For example, the processor 912 can be implemented by one or more integrated circuits, logic circuits, microprocessors or controllers from any desired family or manufacturer.

The processor 912 of the illustrated example includes a local memory 913 (e.g., a cache). The processor 912 of the illustrated example also includes a flight management computer 950. The processor 912 of the illustrated example also is in communication with a main memory including a volatile memory 914 and a non-volatile memory 916 via a bus 918. The volatile memory 914 may be implemented by Synchronous Dynamic Random Access Memory (SDRAM), Dynamic Random Access Memory (DRAM), RAMBUS Dynamic Random Access Memory (RDRAM) and/or any other type of random access memory device. The non-volatile memory 916 may be implemented by flash memory and/or any other desired type of memory device. Access to the main memory 914, 916 is controlled by a memory controller.

The processor platform 900 of the illustrated example also includes an interface circuit 920. The interface circuit 920 may be implemented by any type of interface standard, such as an Ethernet interface, a universal serial bus (USB), and/or a PCI express interface.

In the illustrated example, one or more input devices 922 are connected to the interface circuit 920. The input device(s) 922 permit(s) a user to enter data and commands into the processor 1012. The input device(s) can be implemented by, for example, an audio sensor, a microphone, a keyboard, a button, a mouse, a touchscreen, a track-pad, a trackball, isopoint and/or a voice recognition system.

One or more output devices 924 are also connected to the interface circuit 9920 of the illustrated example. The output devices 924 can be implemented, for example, by display devices (e.g., a light emitting diode (LED), an organic light emitting diode (OLED), a liquid crystal display, a cathode ray tube display (CRT), a touchscreen, a tactile output device, and/or speakers). The interface circuit 920 of the illustrated example, thus, typically includes a graphics driver card, a graphics driver chip or a graphics driver processor.

The interface circuit 920 of the illustrated example also includes a communication device such as a transmitter, a receiver, a transceiver, a modem and/or network interface card to facilitate exchange of data with external machines (e.g., computing devices of any kind) via a network 926 (e.g., an Ethernet connection, a digital subscriber line (DSL), a telephone line, coaxial cable, a cellular telephone system, etc.).

The processor platform 900 of the illustrated example also includes one or more mass storage devices 928 for storing software and/or data. Examples of such mass storage devices 928 include floppy disk drives, hard drive disks, compact disk drives, Blu-ray disk drives, RAID systems, and digital versatile disk (DVD) drives.

The coded instructions 932 of FIG. 6 may be stored in the mass storage device 928, in the volatile memory 914, in the non-volatile memory 916, and/or on a removable tangible computer readable storage medium such as a CD or DVD.

The method herein disclosed enables the pilot and/or systems associated with the teachings of this disclosure to select a trajectory that meets at least two time constraints at different waypoints.

This disclosure relates to a method of controlling the flight of an aircraft subjected to at least two required time of arrival constraints and more specifically to a method to control the flight of an aircraft wherein the aircraft trajectory satisfies two required times of arrival at two different waypoints of a cruise-descent operation, by iterating the aircraft cruise speed and descent speed independently. The method of controlling the flight of the aircraft starts during the cruise phase, and at least one of the waypoints lies in the descent phase of the flight. The disclosure also relates to the system for controlling the flight of an aircraft subjected to at least two required time of arrival constraints and to the computer program, which, when executed, carries out the disclosed method.

The examples disclosed herein relate to methods and systems for controlling the flight of an aircraft subjected to at least two required time of arrival constraints, including, for example, receiving at least two required times of arrival ($RTA_n$), each required time of arrival ($RTA_n$) at a corresponding target waypoint ($WPT_n$) wherein at least one target waypoint is located in a descent phase of the flight; determining a set of cruise/descent speed pairs for each one of the RTAs wherein each pair satisfies the corresponding $RTA_n$ at the corresponding $WPT_n$, the cruise speed and descent speed of each pair being calculated independently from each other; selecting a single cruise/descent speed pair existing in each one of the sets of cruise/descent speed pairs; and determining a single aircraft trajectory that satisfies the selected cruise/descent speed pair.

The examples disclosed herein relate to controlling the flight of an aircraft subjected to at least two required time of arrival constraints. For example, the examples disclosed herein enable the calculation of a single trajectory that meets at least two required times of arrival at different waypoints (e.g., a first waypoint and a second waypoint) by considering independent changes of cruise speed and descent speed for trajectory predictions during execution of an example RTA function.

An example method for controlling the flight of an aircraft subjected to at least two required time of arrival constraints includes receiving at least two required times of arrival ($RTA_n$), each required time of arrival ($RTA_n$) at a corresponding target waypoint ($WPT_n$), each target waypoint ($WPT_n$) being different from each other and at least one target waypoint being located in a descent phase of the flight; determining a set of cruise speed and descent speed pairs for each one of the required times of arrival, wherein each pair satisfies the corresponding required time of arrival ($RTA_n$) at the corresponding target waypoint ($WPT_n$), the cruise speed and descent speed of each pair being calculated independently from each other; selecting a single cruise speed and descent speed pair existing in each one of the sets of cruise speed and descent speed pairs; and determining a single aircraft trajectory that satisfies the selected cruise speed and descent speed pair.

In some examples, the method is executed, at least the first time, during the cruise phase of the aircraft. In some examples, the obtained single aircraft trajectory is sent to an example Flight Management System (FMS) of the aircraft that adapts the speeds and trajectory of the aircraft.

In some examples, for a cruise-descent operation, the aircraft trajectory is defined by the cruise speed and the descent speed. In some examples, for cruise altitudes above 30,000 feet (ft.), which is the case for the vast majority of commercial flights, the cruise speed is expressed as a Mach number. In some examples, the descent is generally flown at constant Calibrated Air Speed (CAS).

In some examples, determining the set of cruise speed and descent speed pairs for each one of the required times of arrival includes determining each set of cruise speed and descent speed pairs by obtaining the descent speed that satisfies the corresponding required time of arrival ($RTA_n$) for a given cruise speed or by obtaining the cruise speed that satisfies the corresponding required time of arrival ($RTA_n$) for a given descent speed.

In some examples, receiving the at least two required times of arrival ($RTA_n$) includes receiving a first required time of arrival ($RTA_1$) at a first target waypoint ($WPT_1$) and a second required time of arrival ($RTA_2$) at a second target waypoint ($WPT_2$), where the first target waypoint is different from the second target waypoint and at least the second target waypoint is located in the descent phase of the flight.

In some examples, selecting the single cruise speed and descent speed pair includes executing a root-finding algorithm for selecting the single cruise speed and descent speed pair. More specifically, in some examples, selecting the single cruise speed and descent speed pair executes an example Broyden's method. While an example Broyden method is mentioned in connection with implementing the examples disclosed herein, other example algorithms may be used for determining the root (e.g., the minimized solution) of the functions that define the sets of Mach/CAS pairs. In some examples, the cruise and descent speeds are selected by minimizing an error between a first estimated time of arrival and a first required time of arrival at a first waypoint by minimizing an error between a second estimated time of arrival and a second required time of arrival at a second waypoint. In some examples, an estimated value and/or approximation is used to seed the iterative process of minimizing the error between an estimated time of arrival and a required time of arrival. In some such examples, instead of using a Jacobian matrix to seed an example Jacobian algorithm, example finite difference approximation and/or a second-order finite difference approximation of the Jacobian (e.g., the Jacobian algorithm) may be used instead. In some examples that use an example Jacobian algorithm and an example Jacobian matrix in connection with the examples disclosed herein, at least some of the input values may be normalized.

In some examples, determining the set of cruise speed and descent speed pairs for each one of the required times of arrival includes establishing contour maps and/or identifying corresponding values wherein each isocontour of the contour map represents a subset of cruise speed and descent speed pairs that satisfies a single required time of arrival ($RTA_n$) at a corresponding target waypoint ($WPT_n$). For this example in which contour maps are used, determining the single aircraft trajectory that satisfies the selected cruise speed and descent speed pair includes selecting the single cruise speed and descent speed pair corresponding to the intersection of all the isocontours of the contour map.

In some examples, the method further includes receiving a set of flight conditions (e.g., predefined and/or measured flight conditions) for delimiting the aircraft speed limits. In some examples, the set of flight conditions includes at least one of a weight of the aircraft, a cruise altitude, an aircraft speed and measured wind and temperature. In some examples, the set of flight conditions includes a flight plan and forecast weather conditions.

In some examples, the method includes computing a predicted flight trajectory of the aircraft based on the received set of flight conditions and the sets of cruise speed and descent speed pairs obtained in determining the set of cruise speed and descent speed pairs for each one of the required times of arrival. In some examples, the predicted flight trajectory includes at least one of a predicted lateral path, estimated arrival times at the intermediate waypoints and estimated altitudes reached at the intermediate waypoints.

In some examples, the method is dynamically and continuously executed during flight so as to modify the single aircraft trajectory by changing the cruise speed and descent speed of the aircraft. Therefore, in such examples, the method dynamically modifies the aircraft speeds and, thus, the trajectory to substantially assure that the aircraft arrives at the waypoints at the corresponding required times of arrival.

An example system for controlling the flight of an aircraft subjected to at least two required time of arrival constraints includes a Flight Management System (FMS) in communication with a trajectory generator and a speed profile generator. In some examples, FMC implements and/or is configured for executing the method previously disclosed and, more generally, the examples disclosed herein. In some examples, a speed profile generator receives and/or is configured for receiving a single cruise speed and descent speed pair and generates a speed profile signal in response to the single cruise speed and descent speed pair. In some examples, a trajectory generator receives and/or is configured for receiving the speed profile signal and generates the single aircraft trajectory in response to the speed profile signal, so that the aircraft trajectory meets and/or substantially meets each required time of arrival ($RTA_n$) at the corresponding target waypoints ($WPT_n$).

In some examples, the FMS receives and/or is configured for receiving a weight of the aircraft and a cruise altitude and determining the aircraft speed limits.

In some examples, the FMS receives and/or is configured for receiving a flight plan, weather conditions, initial aircraft conditions and a cruise altitude and determines the sets of cruise speed and descent speed pairs corresponding to each one of the required times of arrival ($RTA_n$).

An example computer program including program code which, when executed, carries out the method previously described and, more generally, the examples disclosed herein.

Therefore, the examples disclosed herein determine a single global trajectory that satisfies multiple RTAs. In some such examples, the single trajectory will be defined by a single cruise Mach and descent CAS that can be altered independently of each other, which will meet multiple RTAs without having to break the reference trajectory in a plurality of trajectory segments with different cruise and descent speeds. In other words, the examples disclosed herein enable changes to be made during a cruise portion of a flight without altering the descent portion of the flight and/or enable changes to be made during the descent portion of a flight without altering the cruise portion of the flight.

The new degree of freedom provided by the example disclosed herein enable meeting additional required times of arrival at different waypoints, by varying Mach and CAS independently, provides a solution to the problem of multiple RTAs.

The description of the different examples and implementations has been presented for purposes of illustration and description, and is not intended to be exhaustive or limited to the implementations in the form disclosed. Many modifications and variations will be apparent to those of ordinary skill in the art. Further, different examples and implementations may provide different attributes as compared to other examples and implementations. The examples or implementations selected are chosen and described in order to best explain the principles of the implementations, the practical application, and to enable others of ordinary skill in the art to understand the disclosure for various implementations with various modifications as are suited to the particular use contemplated. This written description uses examples to disclose various implementations, which include the best mode, to enable any person skilled in the art to practice these implementations. The patentable scope is defined by the claims and may include other examples that occur to those skilled in the art. Such other examples are intended to be within the scope of the claims if they have stages that do not differ from the literal language of the claims, or if they include equivalent stages with unsubstantial differences from the literal language of the claims.

The example determiner as disclosed in connection with the teaching of this disclosure may be implemented by hardware, software, firmware and/or any combination of hardware, software and/or firmware. Thus, for example, the example determiner could be implemented by one or more analog or digital circuit(s), logic circuits, programmable processor(s), application specific integrated circuit(s) (ASIC(s)), programmable logic device(s) (PLD(s)) and/or field programmable logic device(s) (FPLD(s)). When reading any of the apparatus or system claims of this patent to cover a purely software and/or firmware implementation, at least a portion of the example determiner is/are hereby expressly defined to include a tangible computer readable storage device or storage disk such as a memory, a digital versatile disk (DVD), a compact disk (CD), a Blu-ray disk, etc. storing the software and/or firmware. As used herein, the term tangible computer readable storage medium is expressly defined to include any type of computer readable storage device and/or storage disk and to exclude propagating signals and to exclude transmission media. As used herein, "tangible computer readable storage medium" and "tangible machine readable storage medium" are used interchangeably.

An example method of controlling the flight of an aircraft subjected to at least two required time of arrival constraints includes the processes of: receiving at least two required times of arrival ($RTA_n$), each required time of arrival ($RTA_n$) at a corresponding target waypoint ($WPT_n$), each target waypoint ($WPT_n$) being different from each other and at least one target waypoint being located in a descent phase of the flight; determining a set of cruise speed and descent speed pairs for each one of the required times of arrival wherein each pair satisfies the corresponding required time of arrival ($RTA_n$) at the corresponding target waypoint ($WPT_n$), the cruise speed and descent speed of each pair being calculated independently from each other; selecting a single cruise speed and descent speed pair existing in each one of the sets of cruise speed and descent speed pairs; and, determining a single aircraft trajectory that satisfies the selected cruise speed and descent speed pair.

In some examples, the method of controlling the flight of an aircraft includes determining the set of cruise speed and descent speed pairs includes at least one of determining each set of cruise speed and descent speed pairs by obtaining the descent speed that satisfies the corresponding required time of arrival ($RTA_n$) for a given cruise speed or obtaining the cruise speed that satisfies the corresponding required time of arrival ($RTA_n$) for a given descent speed. In some examples, the method of controlling the flight of an aircraft includes receiving the at least two required times of arrival ($RTA_n$) includes receiving a first required time of arrival ($RTA_1$) at a first target waypoint ($WPT_1$) and a second required time of arrival (RTA$_2$) at a second target waypoint (WPT$_2$), the first target waypoint being different than the second target waypoint and at least the second target waypoint being located in the descent phase of the flight.

In some examples, the method of controlling the flight of an aircraft includes selecting the single cruise speed and descent speed pair includes executing a root-finding algorithm for selecting the single cruise speed and descent speed pair. In some examples, the method of controlling the flight of an aircraft includes determining the set of cruise speed and descent speed pairs includes establishing contour maps wherein each isocontour of the contour map represents a subset of cruise speed and descent speed pairs that satisfies a single required time of arrival (RTA$_n$) at a corresponding target waypoint (WPT$_n$). in some examples, the method of controlling the flight of an aircraft includes determining the single aircraft trajectory includes selecting the single cruise speed and descent speed pair corresponding to the intersection of all the isocontours of the contour map. In some examples, the method of controlling the flight of an aircraft includes receiving a set of flight conditions for delimiting aircraft speed limits including at least one of a weight of the aircraft, a cruise altitude, an aircraft speed and measured wind and temperature.

In some examples, the method of controlling the flight of an aircraft includes the received set of flight conditions further includes a flight plan and forecast weather conditions. In some examples, the method of controlling the flight of an aircraft includes computing a predicted flight trajectory of the aircraft based on the received set of flight conditions and the sets of cruise speed and descent speed pairs obtained in determining the set of cruise speed and descent speed pairs, the predicted flight trajectory including at least one of a predicted lateral path, estimated arrival times at the intermediate waypoints and estimated altitudes reached at the intermediate waypoints. In some examples, the method of controlling the flight of an aircraft includes method being dynamically and continuously executed during flight so as to modify the single aircraft trajectory by changing the cruise speed and descent speed of the aircraft.

An example system for controlling the flight of an aircraft subjected to at least two required time of arrival constraints, the system includes a Flight Management Computer in communication with a trajectory generator and a speed profile generator, the Flight Management System being configured to receive at least two required times of arrival (RTA$_n$), each required time of arrival (RTA$_n$) at a corresponding target waypoint (WPT$_n$), each target waypoint (WPT$_n$) being different from each other and at least one target waypoint being located in a descent phase of the flight; determine a set of cruise speed and descent speed pairs for each one of the required times of arrival wherein each pair satisfies the corresponding required time of arrival (RTA$_n$) at the corresponding target waypoint (WPT$_n$), the cruise speed and descent speed of each pair being calculated independently from each other; select a single cruise speed and descent speed pair existing in each one of the sets of cruise speed and descent speed pairs; and, determine a single aircraft trajectory that satisfies the selected cruise speed and descent speed pair.

In some examples, the system for controlling the flight of an aircraft includes determining the set of cruise speed and descent speed pairs includes at least one of determining each set of cruise speed and descent speed pairs by obtaining the descent speed that satisfies the corresponding required time of arrival (RTA$_n$) for a given cruise speed or obtaining the cruise speed that satisfies the corresponding required time of arrival (RTA$_n$) for a given descent speed. In some examples, the system for controlling the flight of an aircraft includes receiving the at least two required times of arrival (RTA$_n$) includes receiving a first required time of arrival (RTA$_1$) at a first target waypoint (WPT$_1$) and a second required time of arrival (RTA$_2$) at a second target waypoint (WPT$_2$), the first target waypoint being different than the second target waypoint and at least the second target waypoint being located in the descent phase of the flight.

In some examples, the system for controlling the flight of an aircraft includes selecting the single cruise speed and descent speed pair includes executing a root-finding algorithm for selecting the single cruise speed and descent speed pair. In some examples, the system for controlling the flight of an aircraft includes determining the set of cruise speed and descent speed pairs includes establishing contour maps wherein each isocontour of the contour map represents a subset of cruise speed and descent speed pairs that satisfies a single required time of arrival (RTA$_n$) at a corresponding target waypoint (WPT$_n$). In some examples, the method of controlling the flight of an aircraft includes receiving a set of flight conditions for delimiting aircraft speed limits includes at least one of a weight of the aircraft, a cruise altitude, an aircraft speed and measured wind and temperature. In some examples, the system for controlling the flight of an aircraft includes the speed profile generator being configured for receiving a single cruise speed and descent speed pair and generating a speed profile signal in response to said single cruise speed and descent speed pair, and the trajectory generator is configured for receiving the speed profile signal and generating the single aircraft trajectory in response to the speed profile signal, so that the aircraft trajectory meets each required time of arrival (RTA$_n$) at the corresponding target waypoints (WPT$_n$).

In some examples, the system for controlling the flight of an aircraft includes the Flight Management System is configured for receiving a weight of the aircraft and a cruise altitude and determining the aircraft speed limits. In some examples, the system for controlling the flight of an aircraft includes the Flight Management System being configured for receiving a flight plan, weather conditions, initial aircraft conditions and a cruise altitude and determining the sets of cruise speed and descent speed pairs corresponding to each one of the required times of arrival (RTA$_n$). In some examples, an example computer program including program code which, when executed, carries out the examples disclosed herein.

An example method includes in response to a first time of arrival at a first waypoint, determining first cruise speeds and corresponding first descent speeds for the first waypoint at the first time of arrival; in response to a second time of arrival at a second waypoint, determining second cruise speeds and corresponding second descent speeds for the second waypoint at the second time of arrival, at least one of the first waypoint or the second waypoint being in a descent phase of a flight; identifying a third cruise speed and a third descent speed based on the first cruise and descent speeds and the second cruise and descent speeds, the first cruise and descent speeds including the third cruise speed and the third descent speed, the second cruise and descent speeds including the third cruise speed and the third descent speed; and identifying a trajectory of an aircraft that satisfies the third cruise speed and the third descent speed.

In some examples, two or more of the first cruise speeds, the first descent speeds, the second cruise speeds, and the second descent speeds are determined independently. In some example, determining the first cruise speeds and the corresponding first descent speeds for the first waypoint at the first time of arrival includes selecting cruise speeds and descent speeds that satisfy the first time of arrival. In some examples, determining the second cruise speeds and the corresponding second descent speeds for the second waypoint at the second time of arrival includes selecting cruise speeds and descent speeds that satisfy the first time of arrival. In some examples, the method includes accessing the first time of arrival at the first waypoint and accessing the second time of arrival at the second waypoint, the first waypoint being different than the second waypoint. In some examples, identifying the third cruise speed and the third descent speed based on the first cruise and descent speeds and the second cruise and descent speeds includes executing a root-finding algorithm.

In some examples, determining the first cruise speeds and the corresponding first descent speeds for the first waypoint at the first time of arrival includes establishing a contour map including a first isocontour, the first isocontour associated with the first cruise speeds and the corresponding first descent speeds for the first waypoint at the first time of arrival. In some examples, determining the second cruise speeds and the corresponding second descent speeds for the second waypoint at the second time of arrival includes establishing a second isocontour on the contour map, the second isocontour associated with the second cruise speeds and the corresponding second descent speeds for the second waypoint at the second time of arrival. In some examples, identifying the trajectory of the aircraft that satisfies the third cruise speed and the third descent speed is based on the first isocontour and the second isocontour. In some examples, identifying the trajectory of the aircraft that satisfies the third cruise speed and the third descent speed is based on an intersection between the first isocontour and the second isocontour.

In some examples, determining the first cruise speeds and the corresponding first descent speeds for the first waypoint at the first time of arrival is based on one or more of flight conditions, weight of the aircraft, a cruise altitude of the aircraft, aircraft speed range, measured wind, a flight plan, a weather forecast, or temperature. In some examples, the method includes determining fourth cruise speeds and corresponding fourth descent speeds for the first waypoint at the first time of arrival; determining fifth cruise speeds and corresponding fifth descent speeds for the second waypoint at the second time of arrival; and identifying a sixth cruise speed and a sixth descent speed based on the fourth cruise and descent speeds and the fifth cruise and descent speeds. In some examples, determining the fourth cruise and descent speeds and the fifth cruise and descent speeds is based on a change in flight conditions. In some examples, the method includes identifying a trajectory of the aircraft that satisfies the sixth cruise speed and the sixth descent speed.

An example apparatus includes a flight management computer, the flight management computer to: in response to a first time of arrival at a first waypoint, determine first cruise speeds and corresponding first descent speeds for the first waypoint at the first time of arrival; in response to a second time of arrival at a second waypoint, determine second cruise speeds and corresponding second descent speeds for the second waypoint at the second time of arrival, at least one of the first waypoint or the second waypoint being in a descent phase of a flight; identify a third cruise speed and a third descent speed based on the first cruise and descent speeds and the second cruise and descent speeds, the first cruise and descent speeds including the third cruise speed and the third descent speed, the second cruise and descent speeds including the third cruise speed and the third descent speed; and identify a trajectory of an aircraft that satisfies the third cruise speed and the third descent speed.

In some examples, two or more of the first cruise speed, the first descent speed, the second cruise speed, and the second descent speed are determined independently. In some examples, the flight management computer is to determine the first cruise speeds and the corresponding first descent speeds for the first waypoint at the first time of arrival by selecting cruise speeds and descent speeds that satisfy the first time of arrival. In some examples, the flight management computer is to determine the first cruise speeds and the corresponding first descent speeds for the first waypoint at the first time of arrival by establishing a contour map including a first isocontour, the first isocontour associated with the first cruise speeds and the corresponding first descent speeds for the first waypoint at the first time of arrival. In some examples, the flight management computer is to determine the second cruise speeds and the corresponding second descent speeds for the second waypoint at the second time of arrival by establishing a second isocontour on the contour map, the second isocontour associated with the second cruise speeds and the corresponding second descent speeds for the second waypoint at the second time of arrival. In some examples, the flight management computer is to identify the trajectory of the aircraft that satisfies the third cruise speed and the third descent speed is based on the first isocontour and the second isocontour.

The invention claimed is:

1. A method, comprising:
in response to a first time of arrival at a first waypoint, determining, by executing an instruction with at least one flight management computer, first cruise speeds and corresponding first descent speeds for the first waypoint at the first time of arrival;
in response to a second time of arrival at a second waypoint, determining, by executing an instruction with the at least one flight management computer, second cruise speeds and corresponding second descent speeds for the second waypoint at the second time of arrival, at least one of the first waypoint or the second waypoint being in a descent phase of a flight;
identifying, by executing an instruction with the at least one flight management computer, a third cruise speed and a third descent speed based on the first cruise and descent speeds and the second cruise and descent speeds, the first cruise and descent speeds including the third cruise speed and the third descent speed, the second cruise and descent speeds including the third cruise speed and the third descent speed;
identifying, by executing an instruction with the at least one flight management computer, a trajectory of an aircraft that satisfies the third cruise speed and the third descent speed; and
causing, by executing an instruction with the at least one flight management computer, at least one of: 1) the aircraft to travel along the trajectory or 2) the trajectory to be displayed.

2. The method of claim 1, wherein two or more of the first cruise speeds, the first descent speeds, the second cruise speeds, and the second descent speeds are determined independently.

3. The method of claim 1, wherein determining the first cruise speeds and the corresponding first descent speeds for the first waypoint at the first time of arrival includes selecting cruise speeds and descent speeds that satisfy the first time of arrival.

4. The method of claim 1, wherein determining the second cruise speeds and the corresponding second descent speeds for the second waypoint at the second time of arrival includes selecting cruise speeds and descent speeds that satisfy the first time of arrival.

5. The method of claim 1, further including accessing the first time of arrival at the first waypoint and accessing the second time of arrival at the second waypoint, the first waypoint being different than the second waypoint.

6. The method of claim 1, wherein identifying the third cruise speed and the third descent speed based on the first cruise and descent speeds and the second cruise and descent speeds includes executing a root-finding algorithm.

7. The method of claim 1, wherein determining the first cruise speeds and the corresponding first descent speeds for the first waypoint at the first time of arrival includes establishing a contour map including a first isocontour, the first isocontour associated with the first cruise speeds and the corresponding first descent speeds for the first waypoint at the first time of arrival.

8. The method of claim 7, wherein determining the second cruise speeds and the corresponding second descent speeds for the second waypoint at the second time of arrival includes establishing a second isocontour on the contour map, the second isocontour associated with the second cruise speeds and the corresponding second descent speeds for the second waypoint at the second time of arrival.

9. The method of claim 8, wherein identifying the trajectory of the aircraft that satisfies the third cruise speed and the third descent speed is based on the first isocontour and the second isocontour.

10. The method of claim 9, wherein identifying the trajectory of the aircraft that satisfies the third cruise speed and the third descent speed is based on an intersection between the first isocontour and the second isocontour.

11. The method of claim 1, wherein determining the first cruise speeds and the corresponding first descent speeds for the first waypoint at the first time of arrival is based on one or more of flight conditions, weight of the aircraft, a cruise altitude of the aircraft, aircraft speed range, measured wind, a flight plan, a weather forecast, or temperature.

12. The method of claim 1, further including determining fourth cruise speeds and corresponding fourth descent speeds for the first waypoint at the first time of arrival;
determining fifth cruise speeds and corresponding fifth descent speeds for the second waypoint at the second time of arrival; and
identifying a sixth cruise speed and a sixth descent speed based on the fourth cruise and descent speeds and the fifth cruise and descent speeds.

13. The method of claim 12, wherein determining the fourth cruise and descent speeds and the fifth cruise and descent speeds is based on a change in flight conditions.

14. The method of claim 12, further including identifying a trajectory of the aircraft that satisfies the sixth cruise speed and the sixth descent speed.

15. The method of claim 1, wherein a first distance to the first waypoint and a second distance to the second waypoint are different.

16. An apparatus, comprising:
a flight management computer, the flight management computer to:
in response to a first time of arrival at a first waypoint, determine first cruise speeds and corresponding first descent speeds for the first waypoint at the first time of arrival;
in response to a second time of arrival at a second waypoint, determine second cruise speeds and corresponding second descent speeds for the second waypoint at the second time of arrival, at least one of the first waypoint or the second waypoint being in a descent phase of a flight;
identify a third cruise speed and a third descent speed based on the first cruise and descent speeds and the second cruise and descent speeds, the first cruise and descent speeds including the third cruise speed and the third descent speed, the second cruise and descent speeds including the third cruise speed and the third descent speed;
identify a trajectory of an aircraft that satisfies the third cruise speed and the third descent speed; and
cause at least one of: 1) the aircraft to travel along the trajectory or 2) the trajectory to be displayed.

17. The apparatus of claim 16, wherein two or more of the first cruise speed, the first descent speed, the second cruise speed, and the second descent speed are determined independently.

18. The apparatus of claim 16, wherein the flight management computer is to determine the first cruise speeds and the corresponding first descent speeds for the first waypoint at the first time of arrival by selecting cruise speeds and descent speeds that satisfy the first time of arrival.

19. The apparatus of claim 16, wherein the flight management computer is to determine the first cruise speeds and the corresponding first descent speeds for the first waypoint at the first time of arrival by establishing a contour map including a first isocontour, the first isocontour associated with the first cruise speeds and the corresponding first descent speeds for the first waypoint at the first time of arrival.

20. The apparatus of claim 19, wherein the flight management computer is to determine the second cruise speeds and the corresponding second descent speeds for the second waypoint at the second time of arrival by establishing a second isocontour on the contour map, the second isocontour associated with the second cruise speeds and the corresponding second descent speeds for the second waypoint at the second time of arrival.

21. The apparatus of claim 20, wherein the flight management computer is to identify the trajectory of the aircraft that satisfies the third cruise speed and the third descent speed is based on the first isocontour and the second isocontour.

* * * * *